United States Patent
Yoo (10) Patent No.: US 9,176,274 B2
(45) Date of Patent: *Nov. 3, 2015

(54) BACKLIGHT UNIT FOR LIQUID CRYSTAL DISPLAY DEVICE

(71) Applicant: SAMSUNG ELECTRONICS CO., LTD., Suwon-si (KR)

(72) Inventor: Chul Hee Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

This patent is subject to a terminal disclaimer.

(21) Appl. No.: 14/066,287

(22) Filed: Oct. 29, 2013

(65) Prior Publication Data

US 2014/0049729 A1  Feb. 20, 2014

Related U.S. Application Data

(63) Continuation of application No. 11/783,642, filed on Apr. 11, 2007, now Pat. No. 8,596,852.

(30) Foreign Application Priority Data

Apr. 21, 2006 (KR) .................. 10-2006-0036385

(51) Int. Cl.
*F21V 7/04* (2006.01)
*F21V 8/00* (2006.01)
(Continued)

(52) U.S. Cl.
CPC ............ *G02B 6/0075* (2013.01); *G02B 6/0021* (2013.01); *G02B 6/0078* (2013.01);
(Continued)

(58) Field of Classification Search
CPC .. G02B 6/0068; G02B 6/0073; G02B 6/0075; G02B 6/0078; G02B 6/008; G09G 3/33611; G09G 3/3426; G09G 2300/026; G02F 2001/133601
USPC ............... 362/612–613, 615–616; 349/65, 69
See application file for complete search history.

(56) References Cited

U.S. PATENT DOCUMENTS 4,978,952 A 12/1990 Irwin
6,241,358 B1 6/2001 Higuchi et al.
(Continued)

FOREIGN PATENT DOCUMENTS

JP          35129 U     1/1991
JP       11288611 A    10/1999
(Continued)

OTHER PUBLICATIONS

Office Action issued Jul. 23, 2010 in counterpart Taiwanese Application No. 096113425.
(Continued)

*Primary Examiner* — Jason M Han
(74) *Attorney, Agent, or Firm* — Sughrue Mion, PLLC (57) ABSTRACT

A backlight unit for a liquid crystal device capable of obtaining a high-quality image and reduced in thinness. The backlight unit is disposed below a liquid crystal panel to irradiate light thereto. A plurality of separate light guide plates define respective blocks. Groups of LEDs each are disposed along an edge of each of the light guiding plates, each of the LED groups emitting light toward a corresponding one of the light guide plates. The each LED group is turned on and off according to the corresponding block.

11 Claims, 6 Drawing Sheets (51) Int. Cl.
*G09G 3/34* (2006.01)
*G09G 3/36* (2006.01)
*G02F 1/1335* (2006.01)

(52) U.S. Cl.
CPC ............ *G09G3/3426* (2013.01); *G09G 3/3611* (2013.01); *G02B 6/0068* (2013.01); *G02F 2001/133601* (2013.01); *G09G 2300/026* (2013.01)

(56) References Cited

U.S. PATENT DOCUMENTS

| | | |
|---|---|---|
| 7,458,709 B2 | 12/2008 | Lang et al. |
| 2002/0057253 A1 | 5/2002 | Lim et al. |
| 2004/0124764 A1 | 7/2004 | Suzuki et al. |
| 2005/0128374 A1 | 6/2005 | Furukawa |
| 2005/0276075 A1 | 12/2005 | Chen et al. |
| 2006/0109234 A1 | 5/2006 | Hong et al. |

FOREIGN PATENT DOCUMENTS

| | | |
|---|---|---|
| JP | 2001-093321 A | 4/2001 |
| JP | 2002244104 A | 8/2002 |
| JP | 2004-146268 A | 5/2004 |
| JP | 2004184493 A | 7/2004 |
| JP | 2004206916 A | 7/2004 |
| JP | 2004-265635 A | 9/2004 |
| JP | 2005085747 A | 3/2005 |
| JP | 2005-258403 A | 9/2005 |
| JP | 2005-310422 A | 11/2005 |
| JP | 2006154729 A | 6/2006 |
| WO | 2005/112473 A1 | 11/2005 |

OTHER PUBLICATIONS

Japanese Office Action issued on Feb. 15, 2011 in the corresponding Japanese Patent Application No. 2007-108655.
Communication, dated Jun. 11, 2013, issued by the Japanese Patent Office in counterpart Japanese Application No. 2012-029241.
Communication dated Jul. 13, 2010 from the Japanese Patent Office in counterpart Japanese Patent Application 2007-108655.
Korean Office Action issued in Korean Patent Application No. 10-2006-0036385, mailed Jul. 26, 2007.

BACKLIGHT UNIT FOR LIQUID CRYSTAL DISPLAY DEVICE

CLAIM OF PRIORITY

This is a Continuation of application Ser. No. 11/783,642, filed Apr. 11, 2007, which claims the benefit of Korean Patent Application No. 10-2006-0036385 filed on Apr. 21, 2006 in the Korean Intellectual Property Office, the disclosure of which is incorporated herein by reference.

BACKGROUND OF THE INVENTION

1. Field of the Invention

The present invention relates to a backlight unit for a liquid crystal display (LCD) using a light emitting diode (LED) and a light guide plate, more particularly, which can obtain high definition through a high contrast ratio and be reduced in thickness.

2. Description of the Related Art

Recently, with the trend of a thinner and high-performing image display device, a liquid crystal display is prominently utilized in televisions, monitors and the like. A liquid crystal panel does not generate light on its own so that the liquid crystal display requires a backlight unit (BLU). The BLU has adopted as its light source a cold cathode fluorescent lamp (CCFL) which is inexpensive and easy to assemble together. The BLU using the CCFL performs separate driving such as local dimming or impulsive driving. Besides, the CCFL-based BLU is not environment-friendly due to use of a mercury gas, and low in response rate. To overcome this drawback, the CCFL has been replaced by light emitting diodes (LEDs) as the light source for the BLU.

Meanwhile, in a method to drive the BLU by local dimming, the liquid crystal panel of the liquid crystal display is divided into a plurality of areas and brightness of the BLU light source can be adjusted according to the divided areas by a value of a grey level. That is, light emitting diodes (LEDs) of the BLU corresponding to a brighter area in the displayed image are turned on, and the LEDs corresponding to the rest of the image are turned on with low brightness or completely turned off. In the impulsive driving, the BLU is time-synchronized with the liquid crystal panel. Here, a plurality of light source areas arrayed in rows and columns on a BLU board are turned on sequentially.

In general, the BLU includes a direct-type BLU and an edge-type BLU. In the latter, a bar-shaped light source is disposed at an edge of the liquid crystal panel to irradiate light thereonto through a light guide plate. On the other hand, in the former, a surface light source is disposed below the liquid crystal panel to directly irradiate light thereonto.

Figure 1:
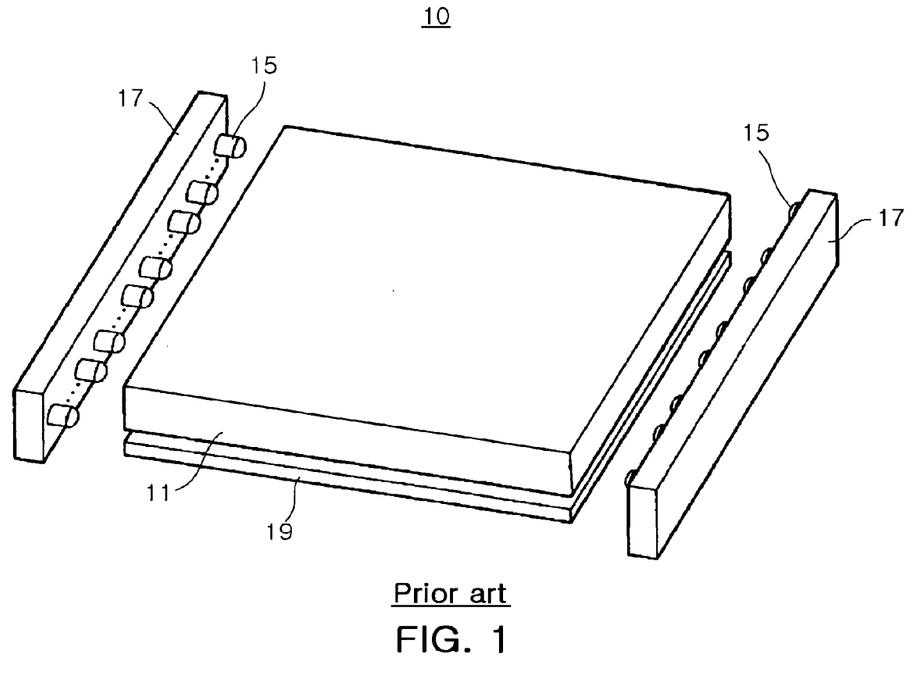
FIG. 1 is a perspective view illustrating a conventional edge-type backlight unit.

FIG. 1 is a perspective view illustrating a conventional edge-type BLU using an LED. Referring to FIG. 1, the BLU 10 includes a light guide plate 11, LED light sources 15 and 17 disposed along edges of the light guide plate 11, respectively, and a reflective plate 19 disposed underneath the light guide plate 11. Each of the LED light sources 15 and 17 includes a printed circuit board 17 and a plurality of LEDs 15 arranged on the board 17. Light incident on the light guide plate 11 from the LEDs 15 is internally total-reflected and scattered, and then transferred to the liquid crystal panel. This edge-type BLU 10 can be manufactured in a relatively small thickness but not suitable for separate driving such as local dimming.

Figure 2:
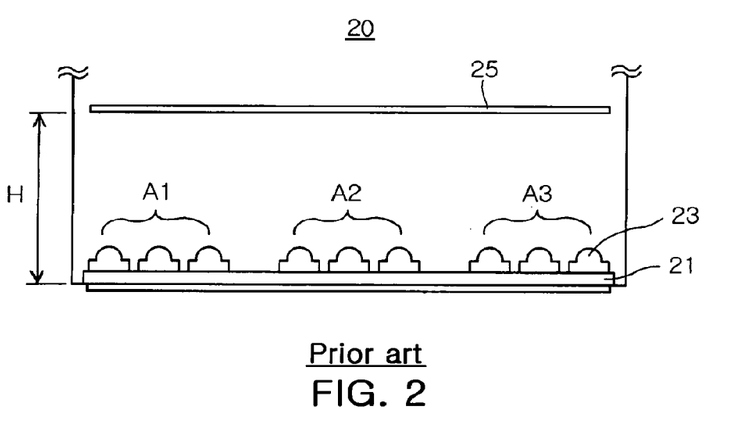
FIG. 2 is a cross-sectional view illustrating a conventional direct-type backlight unit.

FIG. 2 is a perspective view illustrating a conventional direct-type BLU using an LED. Referring to FIG. 2, the BLU 20 includes a PCB 21 and a plurality of light emitting diodes 23 arranged thereon. A diffusing plate 25 is disposed between a liquid crystal panel (not illustrated) and the LEDs to diffuse light. The LEDs 23 directly irradiate light onto the liquid crystal panel. This direct-type BLU 20 can perform separate driving such as local dimming. In order to achieve such local dimming, each of the LEDs 23 can be controlled to be turned on/off. Alternatively, the BLU is divided into predetermined areas, e.g., A1, A2, and A3 areas to drive the LEDs 23 according to the divided areas. However, the LEDs 23, when driven respectively, entail high consumption power, costs for a heat radiating structure for coping with from high temperature and complicated circuits. Meanwhile, the LEDs, when driven according to the divided areas, experience less local dimming effects due to difficulty in dividing the areas and thickness (H) of the BLU. Notably, here, the BLU should be sufficiently thick to assure uniform light, thereby disadvantageous for thinning the BLU and the liquid crystal display.

SUMMARY OF THE INVENTION

The present invention has been made to solve the foregoing problems of the prior art and therefore an aspect of the present invention is to provide a high-quality backlight unit capable of easily achieving separate driving such as local dimming or impulsive driving and suitable for a thin product.

According to an aspect of the invention, the invention provides a backlight unit for a liquid crystal display disposed below a liquid crystal panel to irradiate light thereoto, including a plurality of separate light guide plates defining respective blocks; and groups of LEDs each disposed along an edge of each of the light guiding plates, each of the LED groups emitting light toward a corresponding one of the light guide plates, wherein the each LED group is turned on and off according to the corresponding block.

According to an embodiment of the invention, the each LED group is disposed at an interface between adjacent ones of the blocks. The each LED group for emitting light toward one of the blocks overlaps with an adjacent one of the LED. This reduces a gap between the adjacent ones of the light guide plates. Preferably, the adjacent LED block is provided at an edge with a cutout for giving a space to the overlapping LED group. This allows the each LED group for emitting light toward one of the blocks to easily overlap with the adjacent one of the LED. The cutout has a face selected from an inclined face, a round face and an angled face.

According to a preferred embodiment of the invention, the light guide plates are arranged in a matrix. Preferably, the backlight unit further includes bar-shaped printed circuit boards disposed along the edges of the light guide plates, respectively, wherein the each LED group is arranged on each of the bar-shaped printed circuit boards. Each of the printed circuit boards is disposed to span some of the light guide plate blocks which are arrayed in a row in a direction parallel with the edge of the blocks.

According to another embodiment of the invention, the LED groups can be driven by local dimming. Here, the liquid crystal panel has a plurality of divided areas, and the LEDs have brightness adjusted according to the blocks, by a peak value of a grey level in each of the divided areas.

According to further another embodiment of the invention, the LED groups can be driven impulsively. The blocks are time-synchronized with the liquid crystal panel and turned on sequentially.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 3:
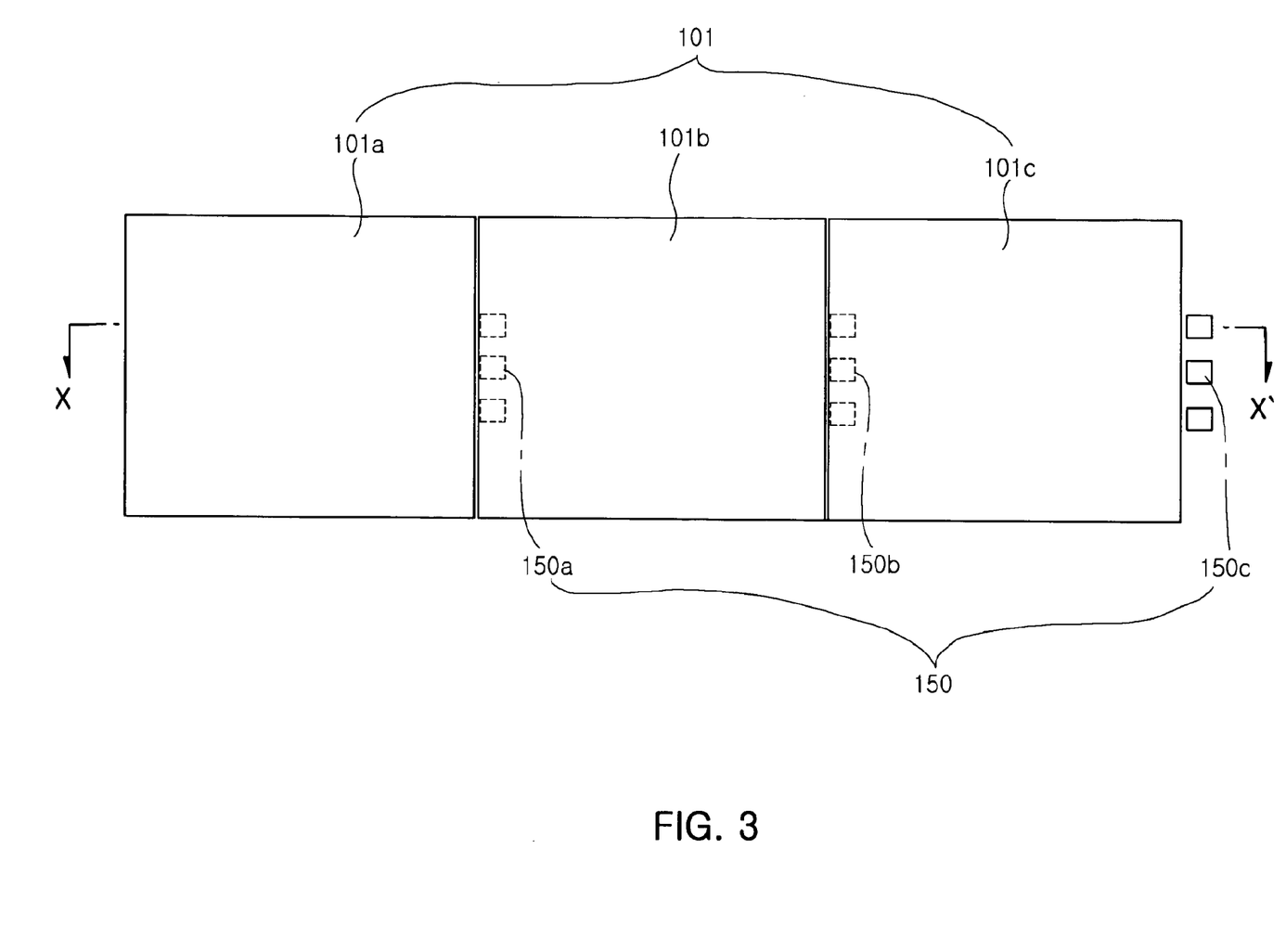
FIG. 3 is a plan view illustrating a light guide plate and LEDs arranged in a backlight unit according to an embodiment of the invention.
Figure 4:
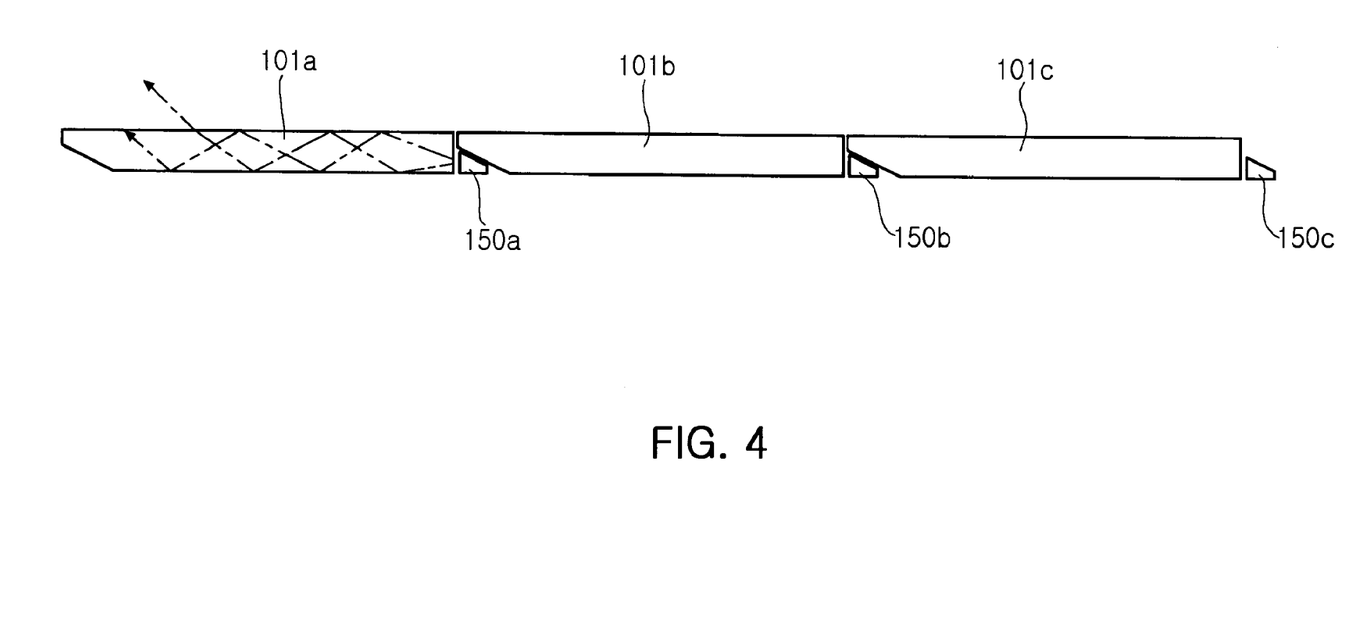
FIG. 4 is a cross-sectional view cut along the line XX' of FIG. 3.

FIG. 3 is a plan view illustrating a light guide plate and light emitting diodes (LEDs) arranged on a backlight unit (BLU) according to an embodiment of the invention. FIG. 4 is a cross-sectional view cut along the line XX' of FIG. 3. Referring to FIGS. 3 and 4, the BLU includes a plurality of separate light guide plates 101 (101a, 101b and 101c) defining respective blocks, and groups of LEDs 150 (150a, 150b and 150c) each disposed along an edge of each of the light guide plate. Specifically, a group of LEDs 150a are disposed along an edge of the light guide plate 101a, which defines one of the blocks to emit light toward the light guide plate 101a. Another group of LEDs 150b are disposed along an edge of the light guide plate 101b, which defines another one of the blocks to emit light toward the light guide plate 101b. A still another group of LEDs 150c are disposed along an edge of the light guide plate 101c, which defines a still another one of the blocks to emit light toward the light guide plate 101c. The light guide plates and the LED groups disposed on each of the light guide plates constitute an overall BLU.

As shown in FIGS. 3 and 4, the each LED group 150a and 150b is disposed at an interface between adjacent ones of the blocks. For example, the LEDs 150a are disposed between the neighboring light guide plates 101a and 101b. Moreover, the LEDs 150a for emitting light toward the light guide plate 101a overlap with the light guide plate 101b. Surely, the LEDs 150c disposed in an outermost position of the light guide plates are not overlapped. For example, the LEDs 150a overlap with the light guide plate 101b, disposed under the light guide plate 101b. In this fashion, the LEDs in the one plate overlap with the adjacent light guide plate so that the neighboring plates are much less spaced apart from each other. This accordingly reduces or removes a gap between the adjacent light guide plates. This also enables light to be emitted uniformly toward the liquid crystal panel.

Figure 5:
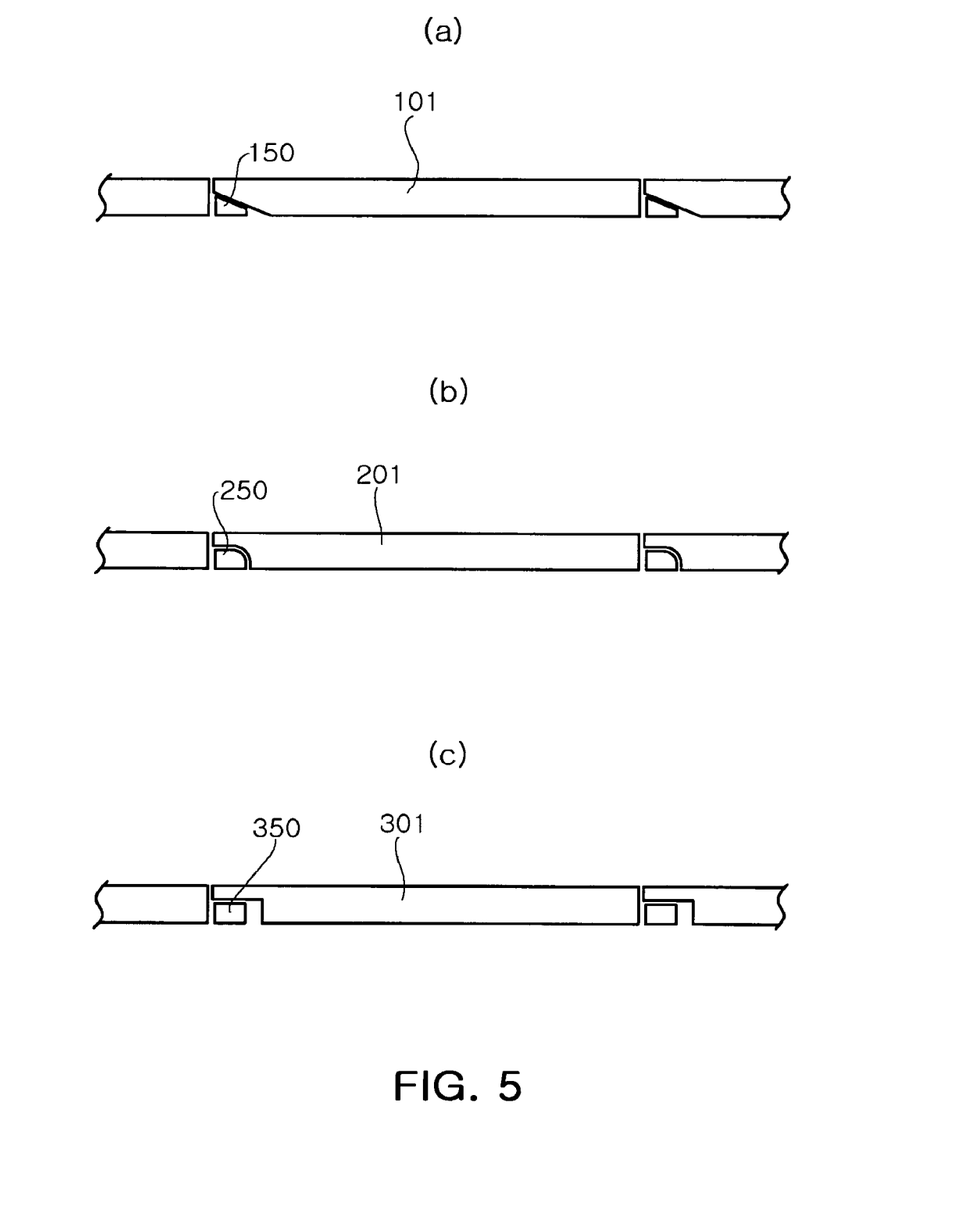
FIG. 5 is a cross-sectional view illustrating a backlight unit according to various embodiments of the invention.

As shown in a cross-section of FIG. 4, the light guide plate 101b is provided with a cutout at a side portion adjacent to the LED group 150a to have the LED group 150a disposed therein. This allows the LED group 150a in the one block to easily overlap with the adjacent light guide plate block 101b. FIG. 5 illustrates various embodiments of the cutout.

As shown in FIG. 5 (a), a light guide plate 101 adjacent to an LED 150 is provided with a cutout at a side end portion thereof (Please be appreciated that only one light guide plate and a corresponding LED are indicated with the reference numerals for the sake of clarity). Here, it should be noted that the light guide plate 101 neighbors another light guide plate toward which the LED 150 emits light. The LED 150 is disposed in the cutout, i.e., in a lower portion of an edge of the light guide plate 101. This also reduces a gap between the light guide plates at both sides of the LED 150. According to another embodiment of the invention, as shown in FIG. 5 (b), a light guide plate 201 adjacent to an LED 250 may be provided with a round cutout formed at a side end portion thereof. Alternatively, as shown in FIG. 5 (c), a light guide plate 301 adjacent to an LED 350 may be provided with a cutout having an angled section.

The LED groups for emitting light toward a corresponding one of the light guide plates defining respective blocks may each include a blue LED, a green LED and a red LED. Here, a plurality of blue, green and red LEDs may be disposed in each of the blocks. Blue, green and red light emitted from the blue, green and red LEDs are combined together into white light having superior color reproducibility. Alternatively, a white LED which, for example, is obtained from the blue LED chip combined with a yellow phosphor, can be disposed at an edge of each of the light guide plates defining respective blocks. Alternatively, a plurality of the white LEDs can be disposed in each of the blocks. Alternatively, the blue, green, red and white LEDs may be disposed along the edge of each of the blocks.

The LEDs disposed at the edge of each of the light guide plates 101a, 101b and 101c can be separately driven according to the blocks. For example, while the LEDs 150b disposed along the one light guide plate block are turned on, the LEDs 150a and 150c disposed along the edges of the other light guiding plate blocks 101a and 101c, respectively may be turned off. Alternatively, the LED groups can be turned on with different brightness according to the blocks. According to the invention, the light guide plates define the respective blocks and the LED groups are disposed in the blocks, respectively, as described above. This enables the each light emitting diode group to be turned on and off according to the corresponding block.

Furthermore, the BLU does not need to be as thick as the conventional BLU (see FIG. 2). That is, according to the invention, light is transferred to the liquid crystal panel through the light guide plate. This assures the LED groups to be separately driven according to the blocks and thus the BLU to be thinned. This yields sufficient effects from separate driving of the LED groups, such as increase in a contrast ratio due to local dimming, and high definition. This also leads to a thin product.

Figure 6:
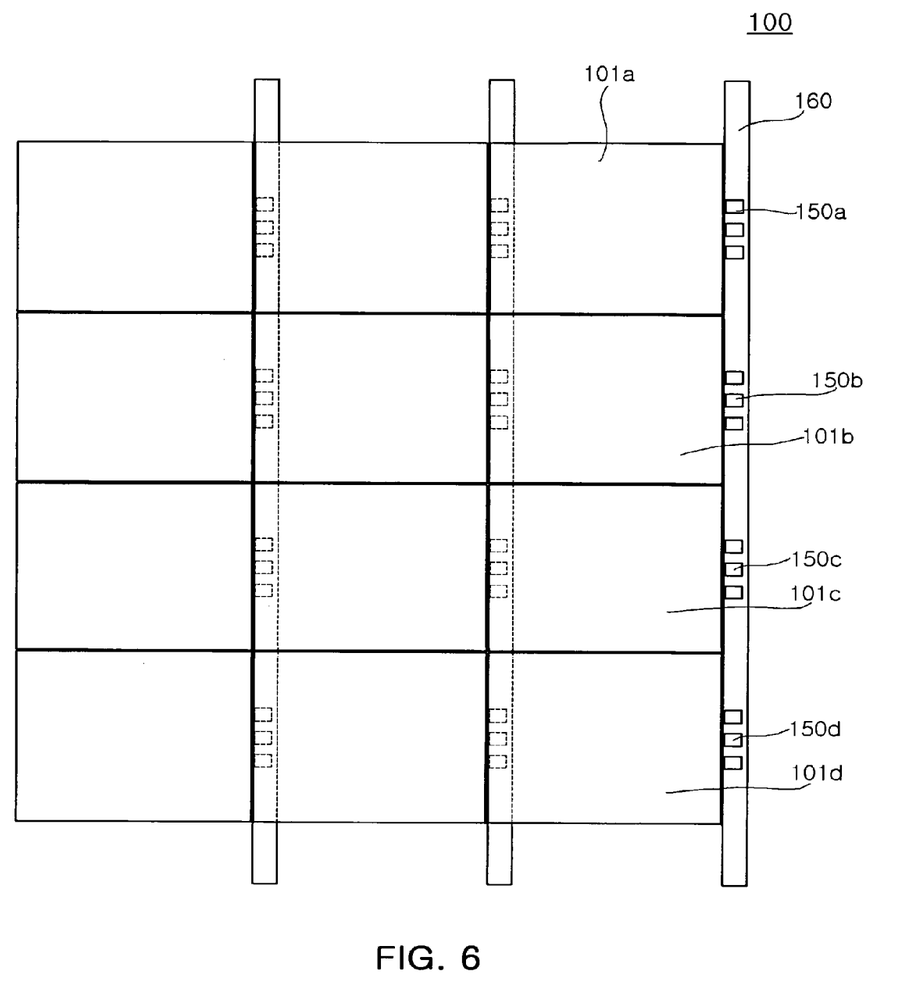
FIG. 6 is a partial plan view illustrating a backlight unit according to an embodiment of the invention.

FIG. 6 is a partial plan view illustrating a BLU according to an embodiment of the invention. Referring to FIG. 6, the BLU 100 includes a plurality of separate light guide plates 101a, 101b, and 101c defining respective unit surface light source blocks. Groups of LEDs 150a, 150b and 150c each are disposed along an edge of each of the light guide plates 101a, 101b, and 101c. Each of the light emitting diode groups emits light toward a corresponding one of the light guide plates. Also, the each LED group 150a, 150b, and 150c is arranged on each of bar-shaped printed circuit boards 160. Notably, each of the bar-shaped printed circuit boards is disposed to span some of the light guide plate blocks which are arrayed in a row in a direction parallel with the edge of the blocks. Thus, each of the printed circuit boards can define a block.

Figure 7:
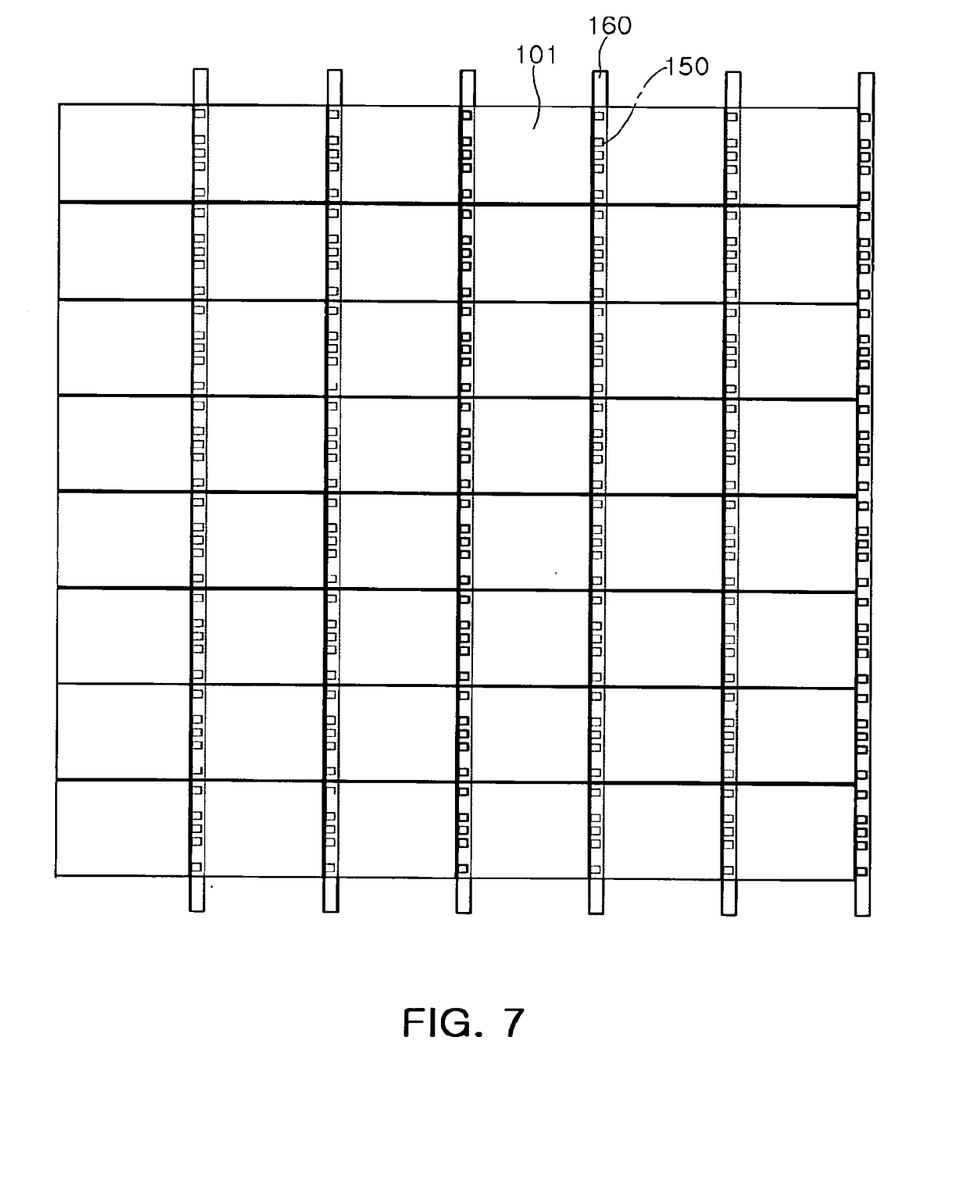
FIG. 7 is an overall plan view illustrating a backlight unit of FIG. 7.

FIG. 7 is an overall plan view illustrating the BLU shown in FIG. 6. As shown in FIG. 7, a plurality of light guide plates 101 are arranged in a matrix. In the matrix of the light guide plates 101, the total number of the light guide plates 101 and the area of the respective light guide plates 101 can be varied. The light guide plate has but not limited to a square shape. For example, the light guide plate has a triangular and hexagonal shape. According to this embodiment of the invention, light emitted from each of the light guide plates defining respective blocks illuminates a liquid crystal panel. The liquid crystal panel is illuminated through the light guide plate, thus obviating a need for a diffusing plate (reference numeral 25 of FIG. 2) required for the direct-type BLU.

The BLU just described offers several advantages in terms of structure and operation thereof. First, a plurality of separate light guide plates define respective blocks, thereby ensuring the each LED group to be turned on and off according to the corresponding block. Each of the bar-shaped printed circuit boards 160 supplies power to the LED groups 150 in a corresponding one of the blocks so that the LED groups can be separately driven according to the blocks. This allows the each LED group to emit light with different brightness according to the corresponding block.

Second, the BLU can be reduced in thickness while capable of being separately driven. The conventional BLU driven by local dimming is a direct-type BLU, thus disadvantageous for thinning the BLU. However, the BLU of the invention employs the plurality of separate light guide plates defining respective blocks. This produces a thin BLU which can be separately driven. Moreover, the BLU of the invention eliminates a need for a diffusing plate required for the direct-type BLU.

Third, the BLU of the invention adopts the separate light guide plates defining respective blocks so that light distribution in one of the blocks can be clearly distinguished from others. In the conventional direct-type BLU (see FIG. 2) performing separate driving, light generated in a specific light source area, e.g., A2, affects other adjacent light source area A1 so that light distribution is not clearly distinct according to each of the light source areas. However, this invention utilizes the completely separated light guide plates, thereby allowing the amount of light to be distinct according to the blocks.

Notably, the BLU of the invention can effectively support local dimming. Here, the liquid crystal panel has a plurality divided areas, and the LED groups have brightness adjusted according to the blocks, by a peak value of a grey level in each of the divided areas. Accordingly, any of the blocks corresponding to brighter areas in a screen are illuminated with relatively high brightness and the remaining portions of the blocks are illuminated with low brightness or completely turned off. With this local dimming, a bright area is more brightened and a dim area is more dimmed, thereby increasing a contrast ratio of the mage. This consequently imparts more vividness to the image. For example, in an image of explosion, the LEDs in the block corresponding to a flame are turned on with high brightness and the LEDs in the block corresponding to the other portion are turned on with low brightness or turned off to ensure a vivid explosion scene.

Moreover, the BLU of the invention can be driven impulsively. Here, the blocks of the BLU are time-synchronized with the liquid crystal panel and turned on sequentially. This impulsive driving can beneficially serve to achieve high-definition and reduce unnecessary lighting time of the LEDs. In addition, the BLU of the invention can support color filterless (CFL) driving which allows colors to be produced without a color filter.

According to the embodiments of the invention, a plurality of light guide plates are arranged in a matrix. But the invention is not limited thereto and the light guide plates can be arranged variously. Moreover, the light guide plates each have but not limited to a square shape. For example, the light guide plates each may have various shapes such as a triangle and a hexagon. Also, the LED groups each are arranged optionally along an edge of each of the light guide plates. For example, the LEDs can be disposed at opposing edges of the light guide plates.

As set forth above, according to exemplary embodiments of the invention, a BLU achieves high definition and high contrast ratio, and effectively performs separate driving. Also, the BLU can be reduced in thickness while capable of performing separate driving, thereby beneficially producing a thin and high-quality liquid crystal display.

While the present invention has been shown and described in connection with the preferred embodiments, it will be apparent to those skilled in the art that modifications and variations can be made without departing from the spirit and scope of the invention as defined by the appended claims.

What is claimed is:

1. A backlight unit for a liquid crystal display disposed below a liquid crystal panel to irradiate light thereto, comprising:
   a plurality of separate light guide plates defining respective blocks; and
   groups of light emitting diodes each disposed along an edge of each of the light guide plates, each group of the light emitting diodes emitting light toward a corresponding one of the light guide plates;
   wherein the each light emitting diode group is turned on and off according to the corresponding block,
   wherein the liquid crystal panel has a plurality of divided areas, and the light emitting diodes have brightness adjusted according to the blocks, by a peak value of a grey level in each of the divided areas, and
   wherein the light emitting diode groups are time-synchronized with the liquid crystal panel and turned on sequentially.

2. The backlight unit according to claim 1, wherein the each light emitting diode group is disposed at an interface between adjacent ones of the blocks.

3. The backlight unit according to claim 2, wherein a light emitting diode group, from among the groups of light emitting diodes, for emitting light toward one of the blocks overlaps with an adjacent other one of the blocks.

4. The backlight unit according to claim 3, wherein the adjacent other one of the blocks includes an edge with a cutout for giving a space to the overlapping light emitting diode group.

5. The backlight unit according to claim 4, wherein the cutout has a face selected from an inclined face, a round face and an angled face.

6. The backlight unit according to claim 1, wherein the light guide plates are arranged in a matrix.

7. The backlight unit according to claim 1, further comprising bar-shaped printed circuit boards disposed along the edges of the light guide plates, respectively,
   wherein the each light emitting diode group is arranged on each of the bar-shaped printed circuit boards.

8. The backlight unit according to claim 7, wherein each of the printed circuit boards is disposed to span some of the light guide plate blocks which are arrayed in a row in a direction parallel with the edge of the blocks.

9. The backlight unit according to claim 8, wherein:
the each light emitting diode group is configured to be independently driven, by the bar-shaped printed circuit boards, so that one group of the light emitting diodes disposed along one of the blocks is turned on, while other groups of the light emitting diodes disposed along other blocks are turned off, or the groups of the light emitting diodes are turned on with different brightness according to the corresponding blocks; and
wherein the bar-shaped printed circuit boards are not disposed in a central region of each of the light guide plates.

10. The backlight unit according to claim 7, wherein:
the each light emitting diode group is configured to be independently driven, by the bar-shaped printed circuit boards, so that one group of the light emitting diodes disposed along one of the blocks is turned on, while other groups of the light emitting diodes disposed along other blocks are turned off, or the groups of the light emitting diodes are turned on with different brightness according to the corresponding blocks; and
wherein the bar-shaped printed circuit boards are not disposed in a central region of each of the light guide plates.

11. A display device comprising:
a display panel; and
a backlight unit which irradiates light to the display panel,
wherein the backlight unit comprises:
a plurality of separate light guide plates defining respective blocks; and
groups of light emitting diodes each disposed along an edge of each of the light guide plates, each group of the light emitting diodes emitting light toward a corresponding one of the light guide plates;
wherein the each light emitting diode group is turned on and off according to the corresponding block,
wherein the display panel has a plurality of divided areas, and the light emitting diodes have brightness adjusted according to the blocks, by a peak value of a grey level in each of the divided areas, and
wherein the light emitting diode groups are time-synchronized with the display panel and turned on sequentially.

* * * * *